United States Patent
Gavrilyuk et al.

(10) Patent No.: US 10,896,342 B2
(45) Date of Patent: Jan. 19, 2021

(54) SPATIO-TEMPORAL ACTION AND ACTOR LOCALIZATION

(71) Applicant: QUALCOMM Incorporated, San Diego, CA (US)

(72) Inventors: Kirill Gavrilyuk, Amsterdam (NL); Amir Ghodrati, Amsterdam (NL); Zhenyang Li, Amsterdam (NL); Cornelis Gerardus Maria Snoek, Volendam (NL)

(73) Assignee: Qualcomm Incorporated, San Diego, CA (US)

( * ) Notice: Subject to any disclaimer, the term of this patent is extended or adjusted under 35 U.S.C. 154(b) by 124 days.

(21) Appl. No.: 16/189,974

(22) Filed: Nov. 13, 2018

(65) Prior Publication Data
US 2019/0147284 A1    May 16, 2019

Related U.S. Application Data

(60) Provisional application No. 62/586,071, filed on Nov. 14, 2017.

(51) Int. Cl.
| | |
|---|---|
| *G06T 7/215* | (2017.01) |
| *G06F 16/73* | (2019.01) |
| *G11B 27/00* | (2006.01) |
| *G06K 9/32* | (2006.01) |
| *G06K 9/00* | (2006.01) |
| *G06T 7/73* | (2017.01) |
| *G06F 16/33* | (2019.01) |

(52) U.S. Cl.
CPC ....... *G06K 9/3241* (2013.01); *G06F 16/3344* (2019.01); *G06F 16/73* (2019.01); *G06K 9/00255* (2013.01); *G06K 9/00281* (2013.01); *G06T 7/215* (2017.01); *G06T 7/73* (2017.01); *G11B 27/00* (2013.01); *G06T 2207/10016* (2013.01); *G06T 2207/20084* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0200253 | A1* | 9/2006 | Hoffberg | H04N 5/782 700/19 |
| 2008/0313119 | A1* | 12/2008 | Leskovec | G06F 16/951 706/46 |
| 2011/0314010 | A1* | 12/2011 | Ganti | G06F 16/2425 707/728 |

(Continued)

OTHER PUBLICATIONS

Chenliang Xu,"Actor-Action Semantic Segmentation with Grouping Process Models", 2016 IEEE Conference on Computer Vision and Pattern Recognition, Date of Conference: Jun. 27-30, 2016, pp. 3083-3089.*

(Continued)

*Primary Examiner* — Omar S Ismail
(74) *Attorney, Agent, or Firm* — Seyfarth Shaw LLP

(57) ABSTRACT

A method of pixel-wise localization of an actor and an action in a sequence of frames includes receiving a natural language query describing the action and the actor. The method also includes receiving the sequence of frames. The method further includes localizing the action and the actor in the sequence of frames based on the natural language query.

20 Claims, 11 Drawing Sheets

(56) References Cited

U.S. PATENT DOCUMENTS

| | | | |
|---|---|---|---|
| 2014/0079297 A1* | 3/2014 | Tadayon | G06K 9/00288 |
| | | | 382/118 |
| 2017/0017696 A1* | 1/2017 | Alonso | G06F 40/169 |
| 2017/0262996 A1 | 9/2017 | Jain et al. | |
| 2018/0068031 A1* | 3/2018 | Hewavitharana | G06F 16/3329 |
| 2018/0107682 A1* | 4/2018 | Wang | G06F 16/583 |
| 2018/0129742 A1* | 5/2018 | Li | G06F 16/7837 |

OTHER PUBLICATIONS

Masataka Yamaguchi, "Spatio-temporal Person Retrieval via Natural Language Queries", 2017 IEEE International Conference on Computer Vision, Date of Conference: Oct. 22-29, 2017, pp. 1453-1460.*

Bastan M., et.,al., "Bilvideo-7: an MPEG-7—Compatible Video Indexing and Retrieval System", IEEE Multimedia, IEEE Service Center, New York, NY, US, vol. 17, No. 3, Jul. 1, 2010, pp. 62-73, XP011342520, ISSN: 1070-986X, DOI: 10.11 09/MMUL.201 0.5692184.

Chenliang X., et al., "Can Humans Fly? Action Understanding with Multiple Classes of Actors", 2015 IEEE Conference on Computer Vision and Pattern Recognition (CVPR), IEEE, Jun. 7, 2015, (Jun. 7, 2015), pp. 2264-2273, XP032793669, DOI: 10.11 09/CVPR. 2015.7298839 [retrieved on Oct. 14, 2015].

Chenxi L., et al., "Recurrent Multimodal Interaction for Referring Image Segmentation", 2017 IEEE International Conference on Computer Vision (ICCV), IEEE, Oct. 22, 2017 (Oct. 22, 2017), pp. 1280-1289, XP033282986, DOI: 10.1109/ICCV.2017.143 [retrieved on Dec. 22, 2017].

International Search Report and Written Opinion—PCT/US2018/061079—ISA/EPO—dated Mar. 4, 2019.

Gavrilyuk K., et al., "Actor and Action Video Segmentation from a Sentence," Computer Vision and Pattern Recognition, Mar. 20, 2018, pp. 1-14.

Hu R., et al., "Segmentation from Natural Language Expressions," Computer Vision and Pattern Recognition, Mar. 20, 2016, pp. 1-25.

Li Z., et al., "Tracking by Natural Language Specification," IEEE Conference on Computer Vision and Pattern Recognition, 2017, pp. 6495-6503.

Yamaguchi M., et al., "Spatio-temporal Person Retrieval via Natural Language Queries," Computer Vision and Pattern Recognition, Aug. 22, 2017, pp. 1-10.

\* cited by examiner

SPATIO-TEMPORAL ACTION AND ACTOR LOCALIZATION

CROSS-REFERENCE TO RELATED APPLICATION

The present application claims the benefit of U.S. Provisional Patent Application No. 62/586,071 filed on Nov. 14, 2017, and titled "SPATIO-TEMPORAL ACTION AND ACTOR LOCALIZATION," the disclosure of which is expressly incorporated by reference herein in its entirety.

BACKGROUND

Field

Aspects of the present disclosure generally relate to actor and action localization and, more particularly, to systems and methods for localizing an actor and an action in a sequence of frames based on a natural language query.

Background

An artificial neural network, which may comprise an interconnected group of artificial neurons (e.g., neuron models), is a computational device, or represents a method to be performed by a computational device. An artificial neural network (ANN) may track a target over a sequence of frames, such as a video. For example, a target tracker may predict the location of a target over a video sequence given an observation of the target at an initial frame of the sequence. Target tracking (e.g., object tracking) may be used for various applications in internet protocol (IP) cameras, Internet of Things (IoT), autonomous driving, and/or service robots. The object tracking applications may improve the understanding of object paths for planning. For example, during autonomous driving, action localization is used to avoid collisions with pedestrians and cyclists.

Conventional object localization systems localize an object in a single image (e.g., a frame). Based on the localization in a first frame of a video, the object may be tracked through multiple frames. In some cases, conventional object localization systems localize an object based on a natural language query. For example, a conventional object localization system may receive a query: "woman in a red shirt." In this example, based on the query, one or more women in red shirts are identified within an image. Specifically, the conventional object localization system may localize (e.g., identify) and classify (e.g., label) the one or more women in red shirts. Based on the classification and localization, the one or more women may be tracked through subsequent frames. The identified actor (e.g., object), such as the one or more women in a red shirt, may be identified by a bounding box that annotates the location of the identified actor.

Conventional object localization systems are limited to localizing an object in a first frame (e.g., single image) and then localizing the object through subsequent frames based on the localization in the first frame. In some cases, the localization may fail when two or more objects with a similar appearance are present in a frame of the video. For example, two women in red shirts may be present in a frame. In this example, for a query, such as "woman in a red shirt that is running," conventional object localization systems cannot determine, from only a single frame, whether one woman is walking and whether the other woman is running. Thus, in this example, the localization may fail (e.g., identify the incorrect woman).

It is desirable to improve systems that rely on a single image (e.g., frame) to localize an actor and an action based on a query. Specifically, it is desirable to improve object localization systems to localize objects in a video based on a natural language query by discriminating actions performed by the objects.

SUMMARY

In one aspect of the present disclosure, a method for pixel-wise localization of an actor and an action in a sequence of frames is disclosed. The method includes receiving a natural language query describing the action and the actor. The method also includes receiving the sequence of frames. The method further includes localizing the action and the actor in the sequence of frames based on the natural language query.

Another aspect of the present disclosure is directed to an apparatus including means for receiving a natural language query describing the action and the actor. The apparatus also includes means for receiving the sequence of frames. The apparatus further includes means for localizing the action and the actor in the sequence of frames based on the natural language query.

In another aspect of the present disclosure, a non-transitory computer-readable medium records program code. The program code is for pixel-wise localization of an actor and an action in a sequence of frames. The program code is executed by a processor and includes program code to receive a natural language query describing the action and the actor. The program code also includes program code to receive the sequence of frames. The program code further includes program code to localize the action and the actor in the sequence of frames based on the natural language query.

Another aspect of the present disclosure is directed to an apparatus for pixel-wise localization of an actor and an action in a sequence of frames. The apparatus has a memory and one or more processors coupled to the memory. The processor(s) is configured to receive a natural language query describing the action and the actor. The processor(s) is also configured to receive the sequence of frames. The processor(s) is further configured to localize the action and the actor in the sequence of frames based on the natural language query.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 7:
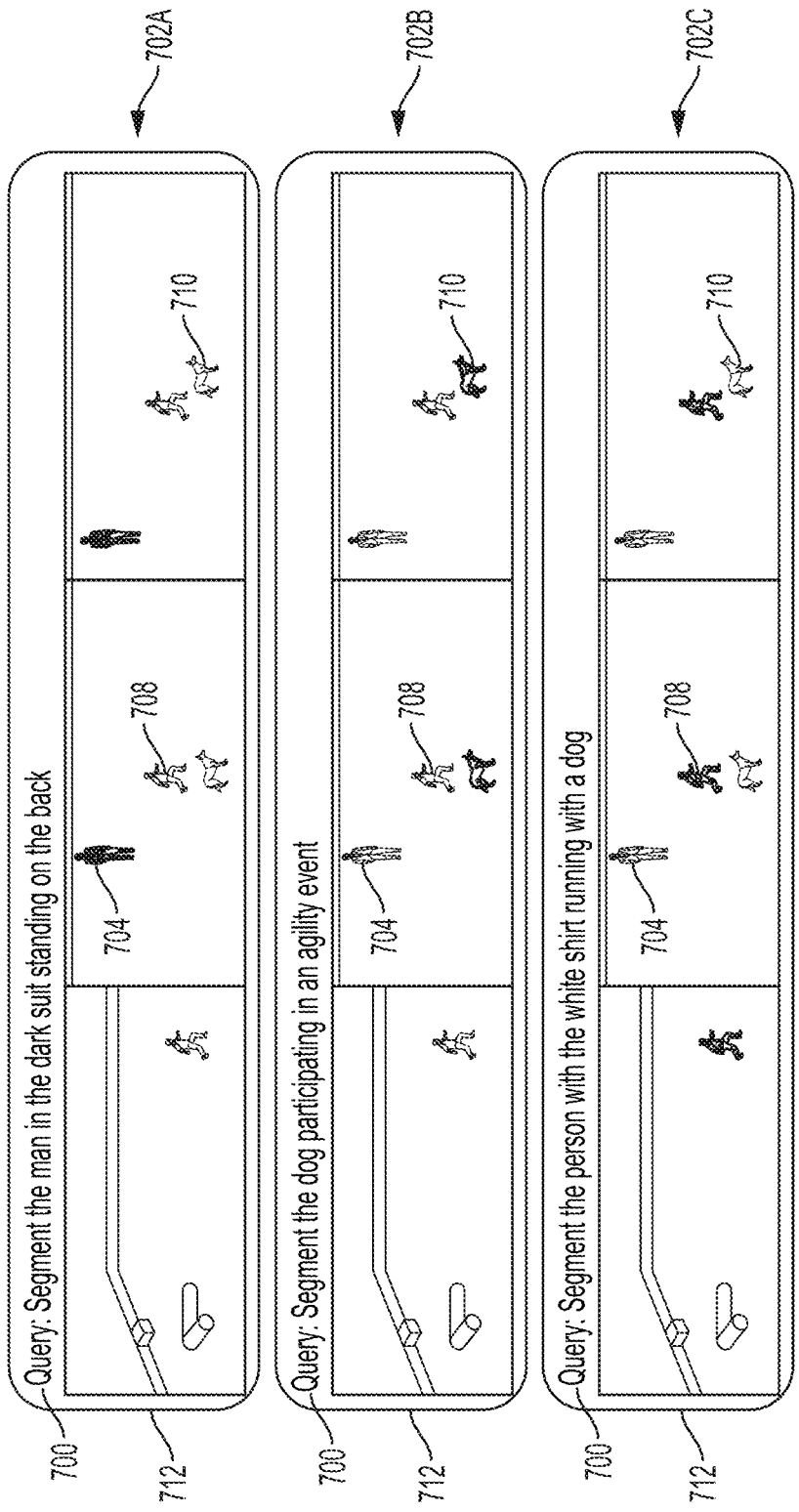
FIG. 7 illustrates an example of segmenting actors and actions, according to aspects of the present disclosure.

Aspects of the present disclosure are directed to segmenting visual objects that are performing actions in a sequence of frames (e.g., video) in response to a natural language query, such as "the person in the white shirt running with a dog" (see FIG. 7). In one configuration, actor and action localization combines both visual information and language information to perform pixel-wise segmentation. In this configuration, dynamic filters are generated based on the natural language query. The dynamic filters may be convolved with each frame of the sequence of frames to perform pixel-wise segmentation. The action and the actor may be localized based on the pixel-wise segmentation. An object that is performing an action, such as a jumping man, a flying bird, or a moving car, may be referred to as an actor.

Joint actor and action inference improves an object localization system in comparison to independent segmentation of an actor and an action, as performed in conventional object localization systems. That is, conventional object localization systems perform segmentation from a fixed set of predefined actor-action pairs. Conventional object localization systems are also limited to identifying actors with a bounding box. The pixel-level segmentation provides a finer granularity in comparison to annotating the actor with a bounding box.

That is, rather than annotating an area around an object with a bounding box, aspects of the present disclosure identify pixels associated with an object of interest (e.g., actor). The pixel-level segmentation of the actor and the actor's action improves an understanding of an actor's actions inside a localization tube (see FIG. 5). The improved understanding improves the spatio-temporal localization of the actor within the sequence of frames. Localization refers to identifying an actor's location within each frame.

Conventional object localization systems (e.g., conventional vision and language systems) perform tasks such as object retrieval, person search, and object tracking. For object segmentation based on a sentence, conventional object localization systems use a long short-term memory (LSTM) network to encode an input sentence into a vector representation. Conventional object localization systems may also use a fully convolutional network to extract a spatial feature map from an image and to output an upsampled response map for the target object. A response map is generated by convolving a visual representation of an image with filters. The visual representation may be downsampled. Therefore, the response map may be upsampled to dimensions of the image.

For object tracking from a sentence, some conventional object localization systems identify a target from a sentence and track the identified target object throughout a video. The target may be identified without specifying a bounding box. In these conventional object localization systems, a convolutional layer dynamically adapts visual filters based on the input sentence. That is, the textual embedding convolution is generated before the matching.

For pixel-wise segmentation from a sentence, aspects of the present disclosure use an end-to-end trainable solution that embeds text and images into a joint model. In contrast to conventional object localization systems, aspects of the present disclosure use a fully convolutional pixel-level model (e.g., encoder-decoder neural architecture) instead of an LSTM network. The fully convolutional model may use dynamic filters. In one configuration, the model segments an actor and the actor's action in a video. That is, an actor and a corresponding action may be segmented in response to a natural language query (e.g., sentence). To improve training, known datasets may be extended to include textual sentences describing the actors and actions in a video.

To perform actor and action segmentation in a video, conventional object localization systems use the Actor-Action Dataset (A2D) that includes a fixed vocabulary, such as a fixed vocabulary with a number of actor-action pairs. The conventional object localization systems build a multi-layer conditional random field model and assign a label from an actor-action product space to each supervoxel from a video. A supervoxel refers to an area of an image that is larger than a conventional voxel. For example, a voxel may be one pixel while a supervoxel may be multiple pixels. Some conventional object localization systems use a grouping process to add long-ranging interactions to the conditional random field. For example, a multi-task ranking model may be used with supervoxel features to perform weakly supervised actor-action segmentation using only video-level tags as training samples. As another example, rather than relying on supervoxels, a multi-task network architecture jointly trains an actor and action detector for a video. In the aforementioned conventional object localization systems, bounding box detections may be extended to pixel-wise segmentations by using segmentation proposals.

Conventional object localization systems are limited to model interactions between actors and actions from a pre-defined set of fixed label pairs. In contrast, aspects of the present disclosure model a joint actor and action space using an open set of labels that are not limited by label pairs. The model of the present disclosure may distinguish between fine-grained actors in the same super-category. For example, a bird may be a super-category and a fine-grained actor may be a specific type of bird, such as a parrot or a duck. Pairs that are outside of the vocabulary may also be segmented. Additionally, rather than generating intermediate super-voxels or segmentation proposals for a video, a pixel-level model may use an encoder-decoder neural architecture that is end-to-end trainable.

Conventional object localization systems may localize a human actor from an image or video based on a sentence. In some conventional object localization systems, a person description dataset is used with sentence annotations and person samples from existing person re-identification datasets. A neural network of a conventional object localization system may capture word-image relations and estimate the affinity between a sentence and an image of a person. The neural network may also perform a spatio-temporal person search in a video. Finally, the neural network may supplement numerous video clips from a dataset, such as an ActivityNet dataset, with person descriptions.

In one configuration, existing datasets, such as A2D and joint-annotated human motion database (J-HMDB), are supplemented with sentence descriptions. Still, the sentence descriptions are supplemented for actor and action segmentation. Where conventional object localization systems use sentences describing human actors for action localization in a video, aspects of the present disclosure generalize to actions performed by any actor. Additionally, in contrast to conventional object localization systems that simplify the localization to a bounding box around the human actor of interest, aspects of the present disclosure output a pixel-wise segmentation of both the actor and the action in a video. Rather than placing a box around an area corresponding to the actor and the action, the pixel-wise segmentation identifies pixels that correspond to both the actor and the action.

Some conventional object localization systems generate a set of action tube proposals, encode each action tube proposal with object classifier responses, and compute a similarity between the high-scoring object categories inside an action proposal and the action query. Rather than relying on action proposals and object classifiers, some conventional object localization systems only use object detectors, enabling a query for spatio-temporal relations between human actors and objects. These conventional object localization systems generate bounding boxes around actions by human actors.

Conventional object localization systems retrieve a specific temporal interval containing actions via a sentence. Other conventional object localization systems use a language input by removing all the action classes associated to a particular actor and transfer the knowledge from the similar actions associated to other actors. For example, these conventional object localization systems train a model for particular actions by an actor, such as a walking cat and a walking adult, and evaluate the transferred knowledge to other actors, such as a walking dog. That is, conventional object localization systems transfer knowledge based on known actor and action classes.

In contrast to conventional object localization systems, aspects of the present disclosure are directed to pixel-wise segmentation for actions performed by an actor. The pixel-wise segmentation may be based on spatio-temporal segmentation from a sentence. Aspects of the present disclosure also transfer knowledge for unknown actor and action classes.

Figure 1:
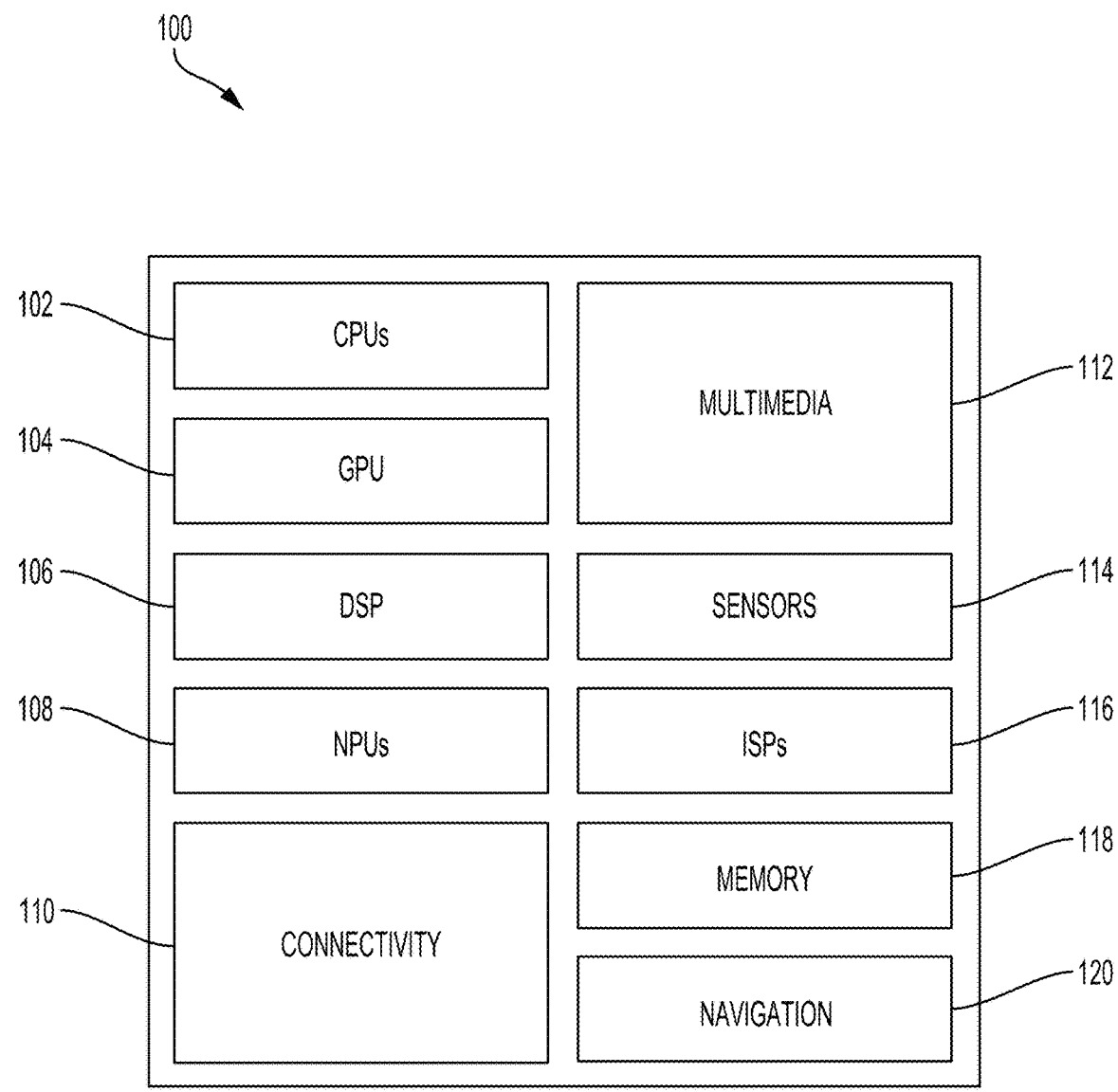
FIG. 1 illustrates an example implementation of designing a neural network using a system-on-a-chip (SOC), including a general-purpose processor in accordance with certain aspects of the present disclosure.

FIG. 1 illustrates an example implementation of a system-on-a-chip (SOC) 100, which may include a central processing unit (CPU) 102 or a multi-core CPU configured to perform spatio-temporal action and actor localization in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to receive a natural language query describing the action and the actor. The instructions loaded into the general-purpose processor 102 may also comprise code to receive the sequence of frames. The instructions loaded into the general-purpose processor 102 may further comprise code to localize the action and the actor in the sequence of frames based on the natural language query.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
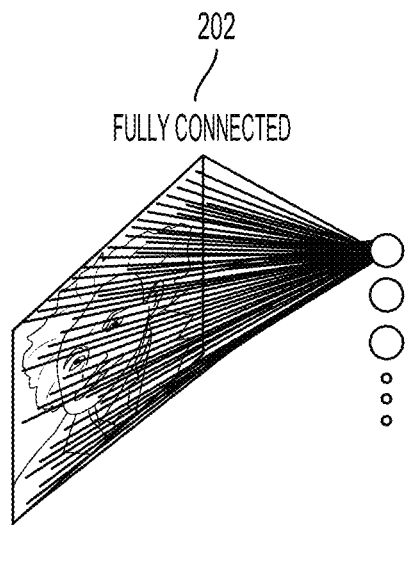
FIGS. 2A, 2B, and 2C are diagrams illustrating a neural network in accordance with aspects of the present disclosure.
Figure 2B:
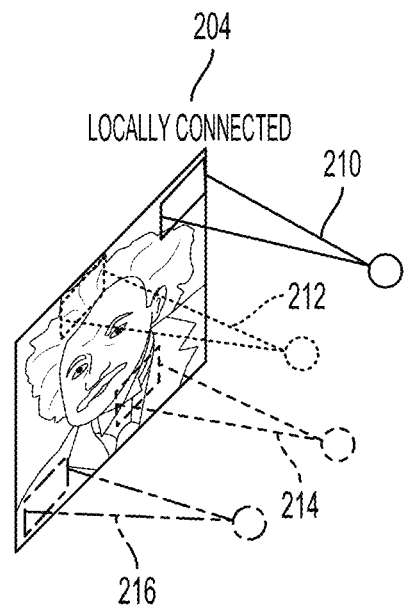

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
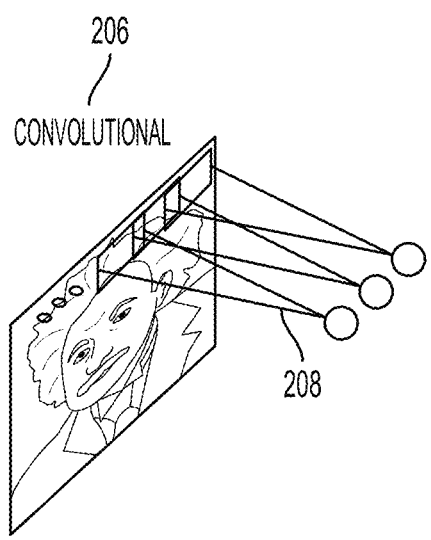

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
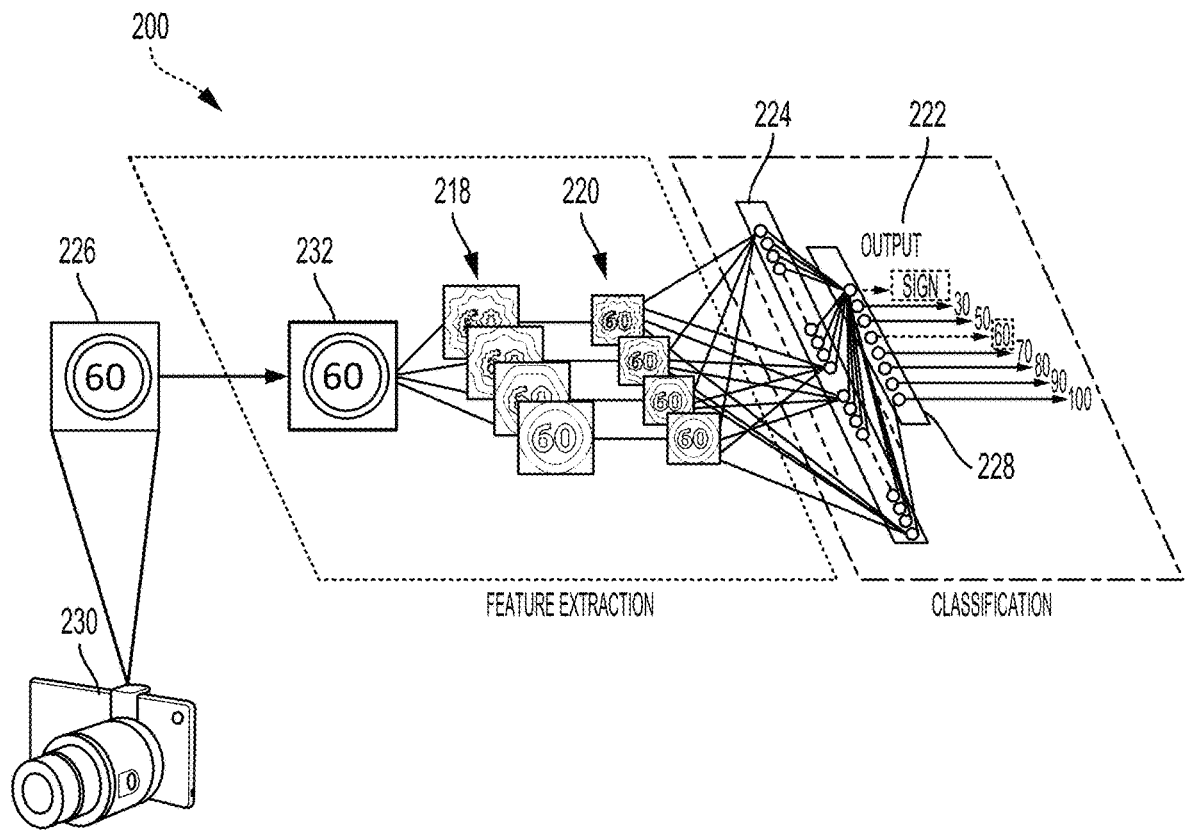
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
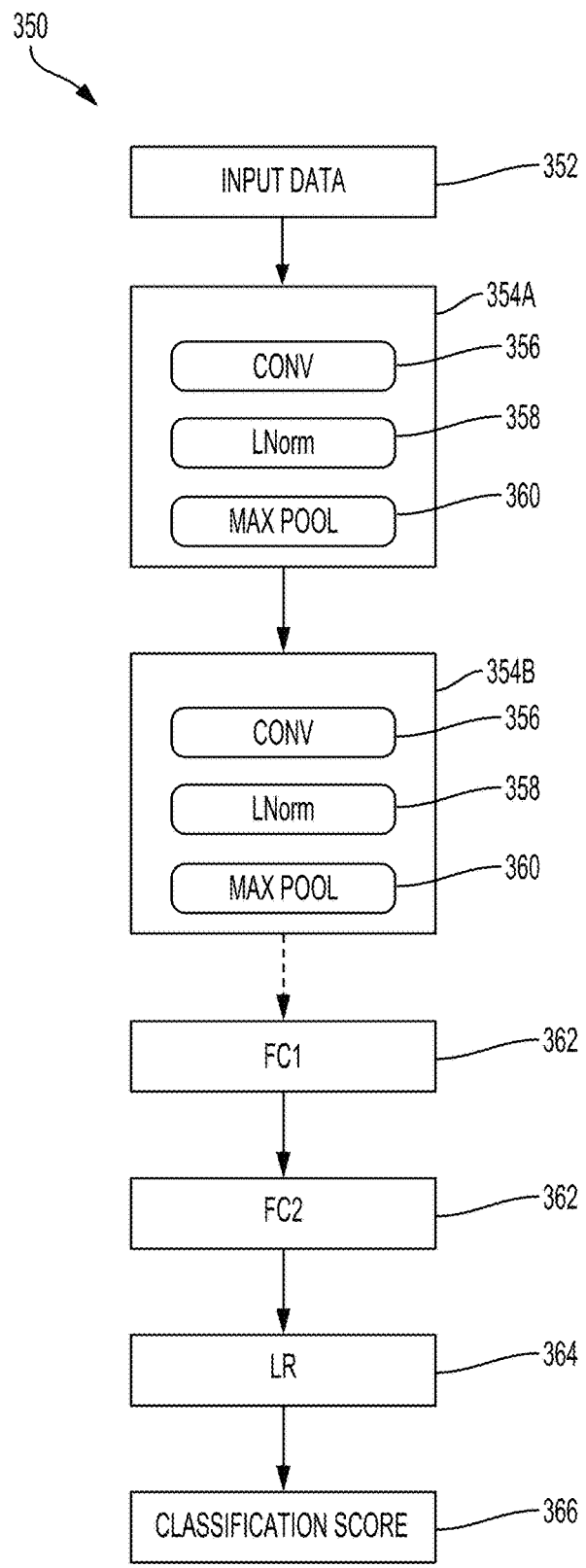
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In one configuration, an actor and action localization model is configured for receiving a natural language query describing an action and an actor. The object tracking model is also configured for receiving a sequence of frames. The object tracking model is further configured for localizing the action and the actor in the sequence of frames based on the natural language query. The model includes a receiving means and/or a localizing means. In one aspect, the receiving means and/or the localizing means may be the general-purpose processor 102, program memory associated with the general-purpose processor 102, memory block 118, local processing units 202, the action and actor localization module 436, processor 404, and or the routing connection processing units 216 configured to perform the functions recited. In another configuration, the aforementioned means may be any module or any apparatus configured to perform the functions recited by the aforementioned means.

According to aspects of the present disclosure, a visual representation is generated from a sequence of frames (e.g., a video). The visual representation encodes information corresponding to both an actor and an action, while preserving spatial information that is used for pixel-wise segmentation. In one configuration, a two stream model is used to generate the visual representation (See FIG. 8, first stream 850 and second stream 852). The model may use two-dimensional (2D) or three-dimensional (3D) filters. In one configuration, the convolutional network considers the spatio-temporal data of the video by using spatio-temporal filters (e.g., 3D filters). The convolutional network may be an inflated 3D (I3D) network. The model may be trained on images from a dataset, such as ImageNet, and videos from a dataset, such as Kinetic.

The I3D network refers to a network with two different 3D networks, each 3D network corresponding to a stream of a two stream architecture. The I3D network repeats the 2D pre-trained weights in the third dimension. In contrast to the single frames of conventional two stream architectures, the spatial stream input of the I3D network includes frames stacked in a time dimension.

In one configuration, prior to inputting frames to the convolutional network, the frames are padded (e.g., zero-padded) to a same size, such as 512×512. Pixel values of an input (e.g., red, green, blue (RGB) input) may be rescaled. For example, the pixel values may be rescaled between −1 and 1. The optical flow may be determined from an optical flow function. For example, the optical flow function may use a total variation (TV−L1) function that is a minimization of a function including a data term using an L1 norm and a regularization term using the total variation of the flow.

Additionally, the pixel values of a flow input may be truncated and rescaled. For example, the pixel values may be truncated to the range [−20, 20] and rescaled between −1 and 1. An initial visual feature representation may have a 32×32 spatial size. In one configuration, the output of the inception block of the convolutional network (e.g., I3D network) may be used as a visual feature representation for both the RGB input and the flow input. The inception block may be defined before the last max-pooling layer. The spatial coordinates of each position may be added as extra channels to the visual representation to allow learning spatial qualifiers like "left of" or "above." L2 normalization may be applied to positions in a spatial feature map to obtain a robust descriptor for each location. For the positions in the spatial feature map, visual features may be concatenated with spatial relative coordinates.

As previously discussed, a natural language expression that describes an actor and an action is received as a query. In one configuration, the query is encoded to take advantage of similarities between different objects and actions from a natural language perspective. That is, the query may be encoded using pre-trained word embedding to improve the understanding of correlations between actors and actions. The model may use pre-trained word embedding to represent each word in the expression. By encoding the query using pre-trained word embedding, the model may be improved because the model may use words that are different from the vocabulary of sentences in the training set. In one configuration, rather than using a long short-term memory (LSTM) network, the natural language expression input is processed with a convolutional neural network, such as a one-dimensional convolutional neural network.

In one configuration, each word of an input sentence is represented as a multi-dimensional vector, such as a 300-dimensional vector, after encoding the query. The embedding may be fixed for all words and may not change during training. Each input sentence may be represented as a concatenation of its individual word representations (e.g., a 10-word sentence is represented by a 10×300 matrix). Each sentence may be padded to have a same size. The size may be a maximum sentence length. The network may include a convolutional layer with a temporal filter size equal to two and with a number of output feature maps as dimensions of the pre-trained word embedding. The convolutional neural network includes a convolutional layer followed by a rectified linear unit (ReLU) activation function and a max-pooling layer to obtain a representation of the convolutional neural network (e.g., text sequence).

Dynamic convolutional filters may be used to perform pixel-wise segmentation from a natural language sentence (e.g., query). In contrast to static convolutional filters that are used in conventional convolutional neural networks, dynamic filters are generated based on the input, such as the encoded sentence representation. The dynamic filters improve the model by transferring textual information to the visual domain. The dynamic filters may be generated for several resolutions to be used with different networks. For example, given a text representation T, dynamic filters f are generated by a single layer perceptron:

$$f = \tanh(W_f T + b_f), \qquad (1)$$

where tanh is hyperbolic tangent function, $W_f$ is a weight, and $b_f$ is a bias of the single layer perceptron. The variable f has the same number of channels as a visual representation $V_t$ for the frame at timestamp t. The dynamic filters are convolved with the visual representation $V_t$ to obtain a pixel-wise segmentation response map $(S_t)$:

$$S_t = f * V_t. \qquad (2)$$

A deconvolutional neural network may also be used to up-sample feature maps of the frame after the initial convolution. That is, the deconvolutional neural network transforms the feature maps generated by the initial convolutional neural network. For example, the convolutional neural network may downsample an image to generate feature maps and the deconvolutional neural network may up-sample the feature maps to generate the image. In addition, the deconvolutional neural network may train the model using segmentation masks with a same size as the input videos. In one configuration, the visual representation $V_t$ is upsampled to improve a detection of small objects. The up-sampling may also improve the segmentation predictions, such that the segmentation predictions are smoother (e.g., the edges of the prediction are smoother).

The deconvolutional network may include two blocks. A first block may include a deconvolutional layer and the second block may include a convolutional layer. Dynamic filters of the deconvolutional network may be generated from the natural language query and a visual representation from a previous block. The deconvolutional layer may have a kernel size of eight and a stride size of four. The convolutional layer may have a kernel size of three and a stride of one.

During training, for each training sample, a loss $\mathcal{L}$ is computed for multiple resolutions:

$$\mathcal{L} = \sum_{r \in R} \alpha_r \mathcal{L}^r \qquad (3)$$

$$\mathcal{L}^r = \frac{1}{r^2} \sum_{i=1}^{r} \sum_{j=1}^{r} \mathcal{L}_{ij}^r, \qquad (4)$$

where R is a set of resolutions, and $\alpha_r$ is a weight for a specific resolution r. In one configuration, R={32, 128, 512} (e.g., 32×32 pixels, 128×128 pixels, and 512×512 pixels).

Pixel-wise loss $\mathcal{L}_{ij}^r$ is a logistic loss defined as follows:

$$\mathcal{L}_{ij}^r = \log(1 + \exp(-S_{ij}^r Y_{ij}^r)), \qquad (5)$$

where $S_{ij}^r$ is a response value of the model at pixel (i,j) for a resolution r, $Y_{ij}^r$ is a binary label at pixel (i,j) for the resolution r, and $Y^r$ is downsampled to a size r×r of a ground truth binary mask. That is, $S_{ij}^r$ is the prediction and $Y_{ij}^r$ is the ground truth. The variables i and j are spatial coordinates (e.g., (x,y) coordinates).

Figure 4:
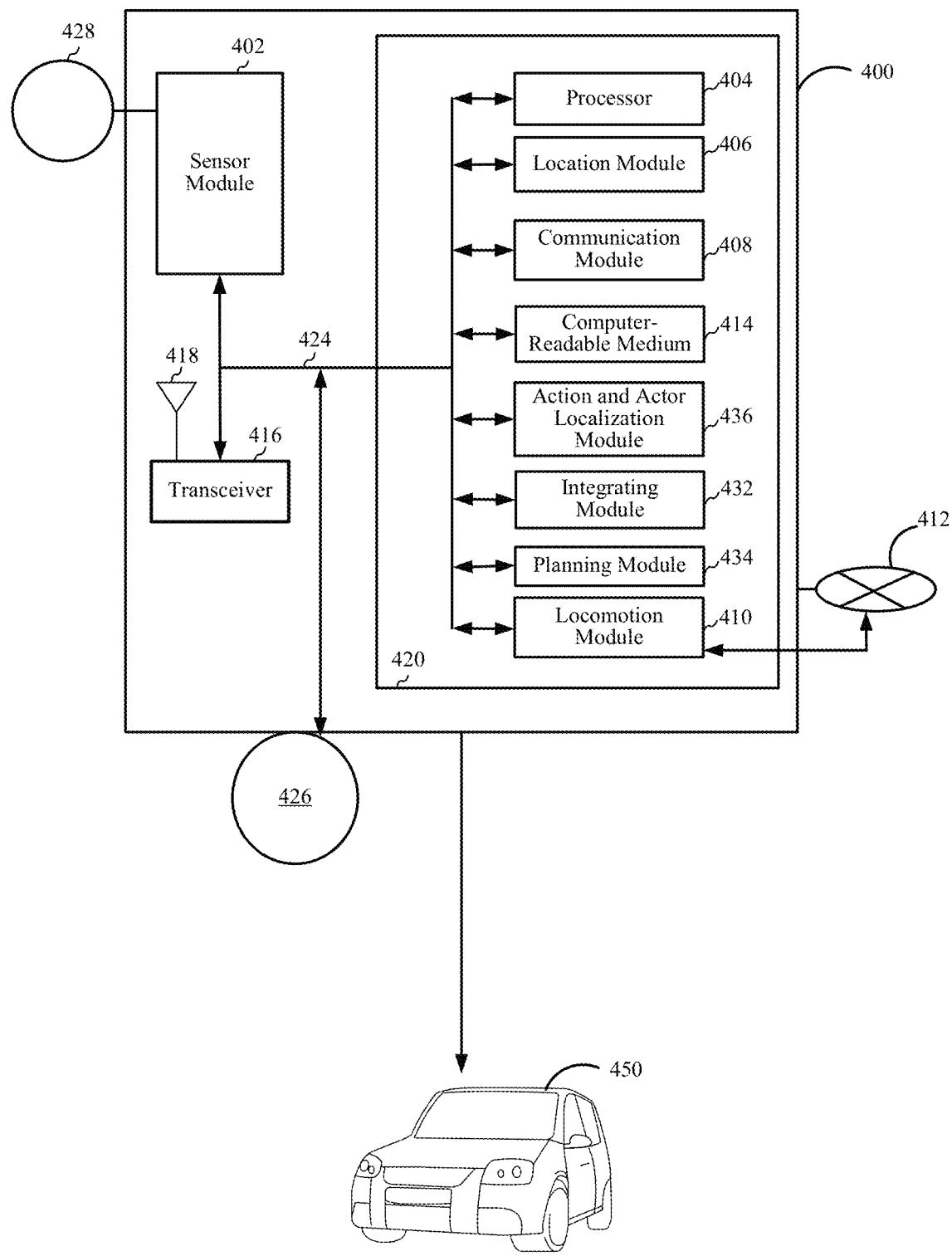
FIG. 4 is a block diagram illustrating different modules/means/components in an exemplary apparatus comprising an actor and action localization module, according to aspects of the present disclosure.

As previously discussed, actor and action localization may be used in various applications. FIG. 4 is a diagram illustrating an example of a hardware implementation for an apparatus 400 employing a processing system 420 and an action and actor localization module 436. The apparatus 400 may be a component of various types of devices or vehicles, such as a car 450, a drone (not shown), or a robotic device (not shown). The devices and vehicles may be autonomous or semi-autonomous.

The action and actor localization module 436 may be configured to localize an actor and an action from a video input based on a natural language query. In one configuration, the action and actor localization module 436 is configured for receiving a natural language query describing an action and an actor. The action and actor localization module 436 may be further configured for receiving a sequence of frames. The action and actor localization module 436 may be also configured for localizing the action and the actor in the sequence of frames based on the natural language query. The action and actor localization module 436 may include an artificial neural network, such as an I3D convolutional network and a one-dimensional convolutional network.

The processing system 420 may be implemented with a bus architecture, represented generally by the bus 424. The bus 424 may include any number of interconnecting buses and bridges depending on the specific application of the processing system 420 and the overall design constraints. The bus 424 links together various circuits including one or more processors and/or hardware modules, represented by the processor 404, the communication module 408, location module 406, sensor module 402, locomotion module 410, and the computer-readable medium 414. The bus 424 may also link various other circuits such as timing sources, peripherals, voltage regulators, and power management circuits, which are well known in the art, and therefore, will not be described any further.

The apparatus 400 includes the processing system 420 coupled to a transceiver 416. The transceiver 416 is coupled to one or more antennas 418. The transceiver 416 enables communicating with other devices over a transmission medium. For example, the transceiver 416 may receive user input via transmissions from a remote device. The processing system 420 includes the processor 404 coupled to the computer-readable medium 414. The processor 404 is responsible for general processing, including the execution of software stored on the computer-readable medium 414. The software, when executed by the processor 404, causes the processing system 420 to perform the various functions described for any particular apparatus. The computer-readable medium 414 may also be used for storing data manipulated by the processor 404 when executing software.

The sensor module 402 may obtain measurements via a first sensor 428 and/or a second sensor 426. The first sensor 428 may be a stereovision sensor. The second sensor 426 may be a camera. The first sensor 428 and the second sensor 426 perform measurements and/or capture images. Of course, the first sensor 428 and the second sensor 426 are not limited to a stereo-vision sensor and a camera, as other types of sensors, such as, for example, vision, radar, thermal, sonar, and/or lasers are also contemplated for performing measurements.

The output of the first sensor 428 and the second sensor 426 may be processed by one or more of the processor 404, the communication module 408, location module 406, locomotion module 410, and/or the computer-readable medium 414. As previously discussed, the output from the first sensor 428 may obtain depth measurements. Furthermore, the output from the second sensor 426 may be processed by the action and actor localization module 436. In one configuration, the output of the first sensor 428 and the second sensor 426 are transmitted to an external device by the transceiver 416. The first sensor 428 and the second sensor 426 are not limited to being defined external to the apparatus 400. As shown in FIG. 4, the first sensor 428 and the second sensor 426 may be defined within the apparatus 400.

The location module 406 may determine a location of the apparatus 400. The communication module 408 may use the transceiver 416 to send and receive information, such as the location of the apparatus 400, to an external device. The locomotion module 410 may provide locomotion to the apparatus 400. As an example, locomotion may be provided via rotary blades 412. Of course, aspects of the present disclosure are not limited to providing locomotion via rotary blades 412 and are contemplated for any other type of component for providing locomotion, such as propellers, wheels, treads, fins, and/or jet engines.

The processing system 420 includes an integrating module 432 for integrating a depth map with localization information to generate a three-dimensional (3D) map. The processing system 420 also includes a planning module 434 for planning a motion based on the 3D map, the localization information, and/or a user input. The modules may be software modules running in the processor 404, resident/stored in the computer-readable medium 414, one or more hardware modules coupled to the processor 404, or some combination thereof.

The action and actor localization module 436 may control the locomotion module 410. That is, based on a localized action and actor, the apparatus 400 may avoid a collision with an object, track an object, or perform other functionality. The action and actor localization module 436 may receive a natural language query from the transceiver 416, a first sensor 428, and/or a second sensor 426. In one configuration, the action and actor localization module 436 are integrated with the processor 404. The action and actor localization module 436 may include an artificial neural network. Furthermore, the action and actor localization information may be transmitted from the action and actor localization module 436 to the integrating module 432 and/or the planning module 434.

Figure 5:
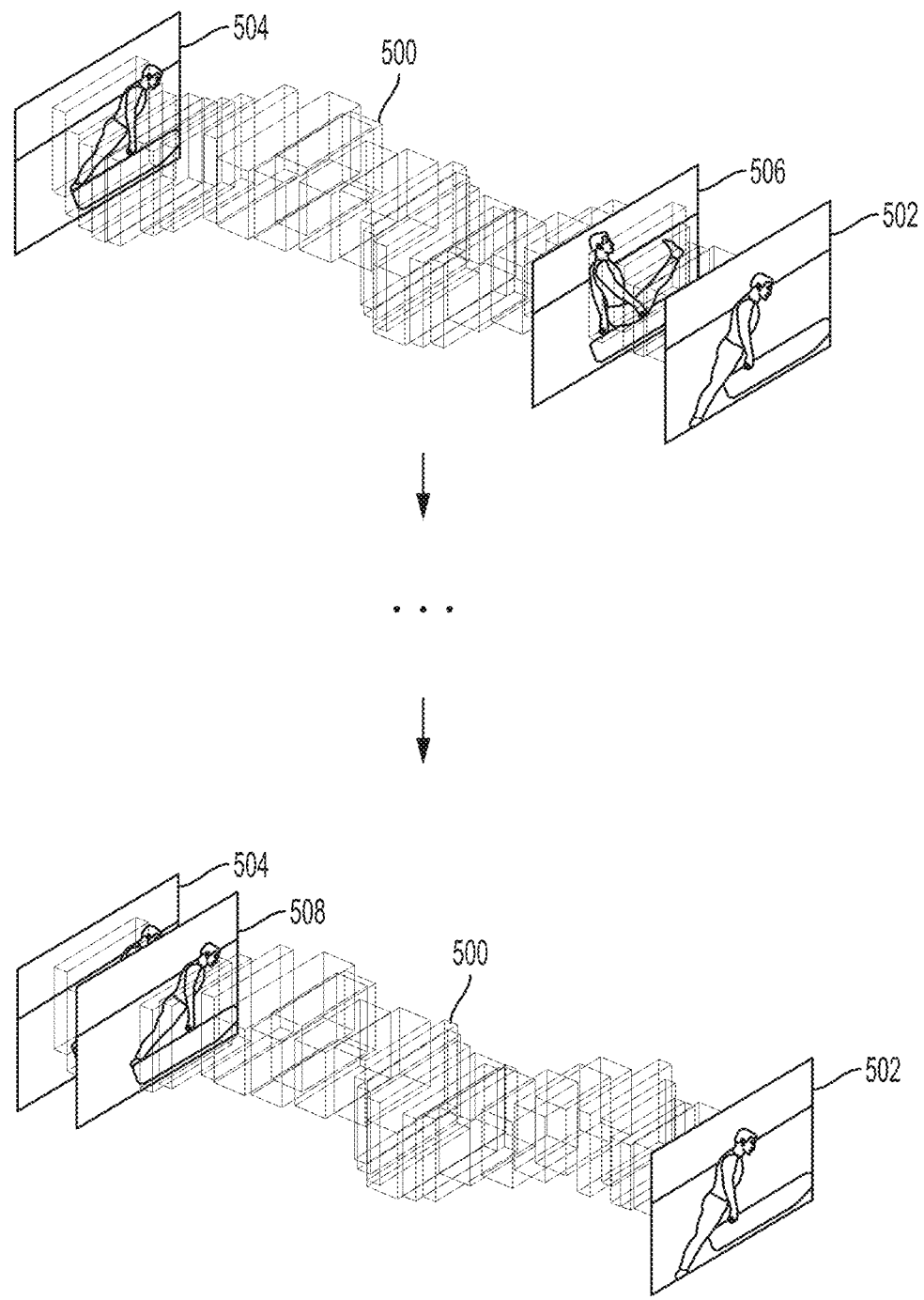
FIG. 5 illustrates an example of a localization tube, according to aspects of the present disclosure.

As discussed, the pixel-level segmentation of the actor and the actor's action improves an understanding of an actor's actions inside a localization tube. FIG. 5 illustrates an example of a localization tube 500. As shown in FIG. 5, the tube 500 is generated based on the sequence of bounding boxes between an initial frame 502 of a sequence of frames and a final frame 504 of the sequence of frames. As a location of an action changes between frames, the location of the bounding box corresponding to the action also changes between frames. For example, the location of the action changes from the first frame 502 to a second frame 506. Likewise, the location of the action changes from the second frame 506 to a third frame 508. The movement of the bounding boxes over the sequence of frames is tracked by the tube 500. A level of uncertainty may alter the tube 500. For example, as shown in FIG. 5, the tube 500 is smooth when there is low uncertainty in the bounding boxes (e.g., proposed actor locations). As another example, which is not shown in FIG. 5, a tube may be sporadic when there is high uncertainty in the bounding boxes.

As discussed above, the tube 500 is generated based on the sequence of bounding boxes between an initial frame 502 of a sequence of frames and a final frame 504 of the sequence of frames. Aspects of the present disclosure provide a finer granularity for the actor's actions inside a localization tube by performing a pixel-wise segmentation.

Figure 6A:
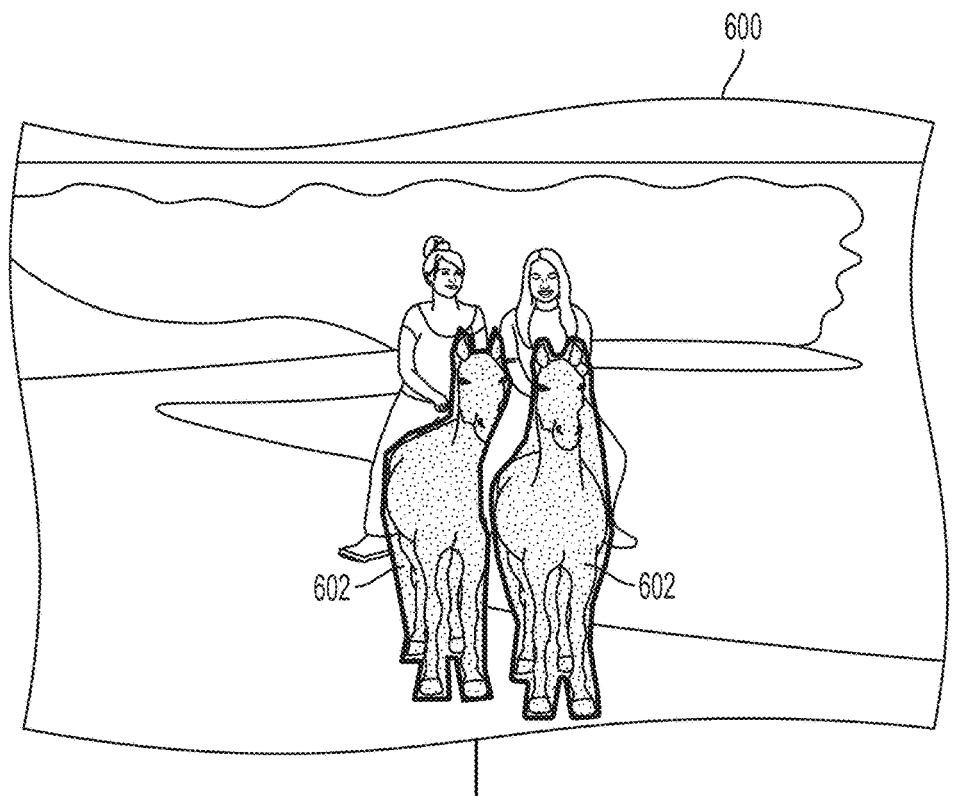
FIGS. 6A, 6B, and 6C illustrate examples of actor localization.
Figure 6B:
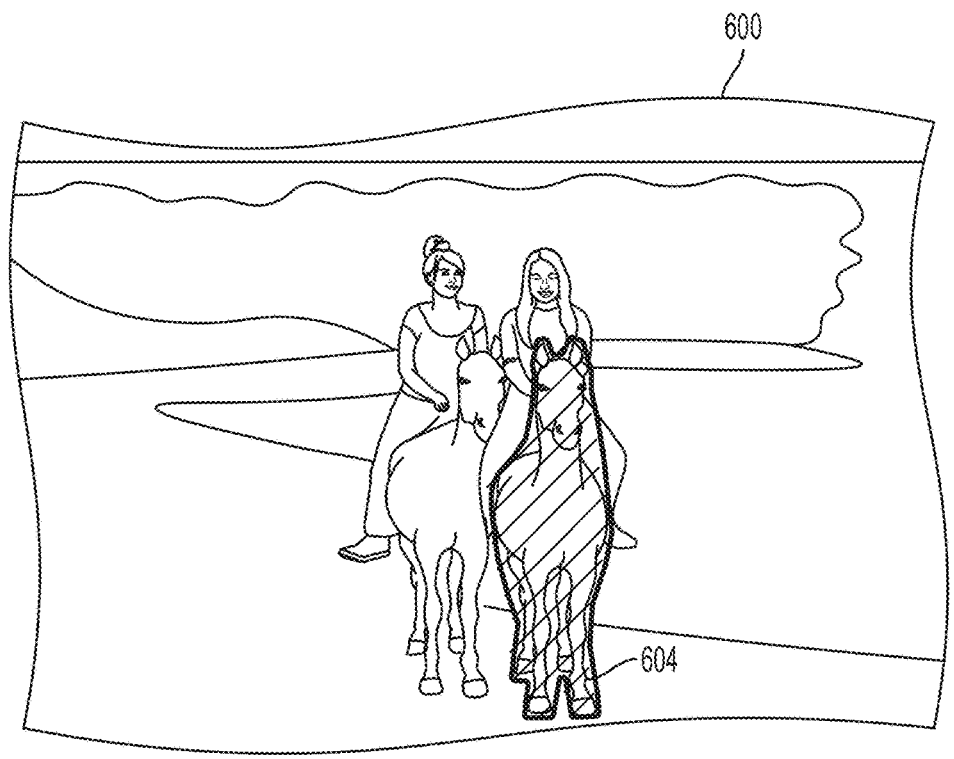

The segmentation performed by some object localization systems is limited to actor segmentation and is not directed to action and actor segmentation. FIGS. 6A and 6B illustrate examples of still image (e.g., frame 600) segmentation performed by vision and language systems. In FIG. 6A, the object localization system performs image segmentation on the frame 600 based on a class of an actor (e.g., horse 602). In this example, both horses 602 in the frame 600 are segmented.

In FIG. 6B, the object localization system performs image segmentation on the frame 600 based on a query, such as "a horse with a woman in a striped shirt." In this example, only a horse 604 carrying a woman in a striped shirt in the frame 600 is segmented. The segmentation identifies the actor corresponding to the class or query. Based on the segmentation at the frame 600, the identified actor may be segmented in subsequent frames. Some object localization systems do not segment both an action and an actor. For example, the segmentation in FIGS. 6A and 6B is limited to actor segmentation. Furthermore, the segmentation performed by the object localization systems, such as the segmentation in FIGS. 6A and 6B, is not performed for a sequence of frames (e.g., video).

Figure 6C:
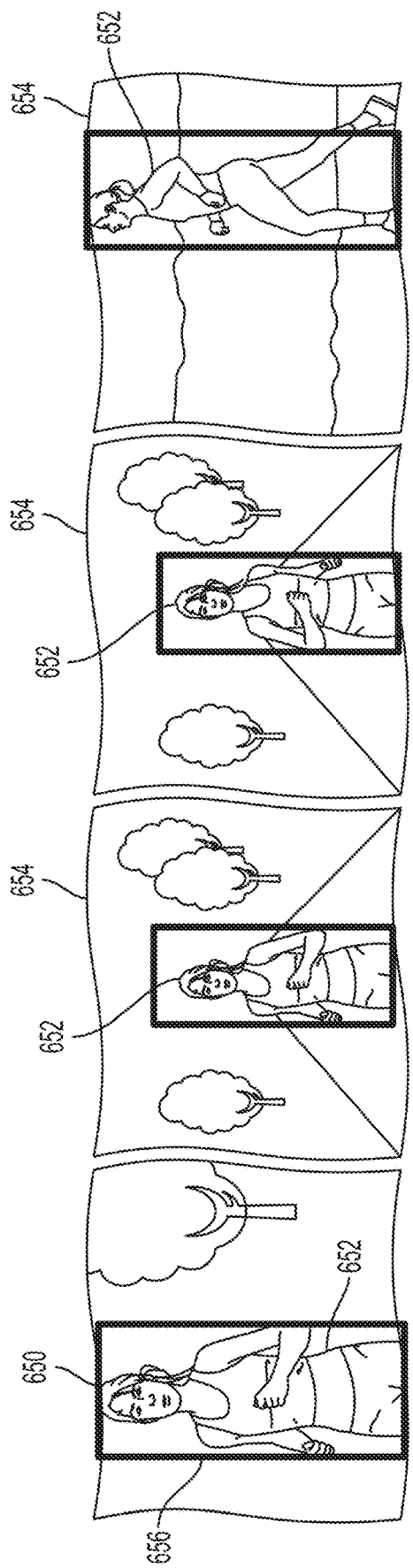

Other object localization systems may perform image localization based on a query. FIG. 6C illustrates an example of image localization based on a query: "track the woman with the ponytail running." The localization is performed for a frame (e.g., frame 650). The frame may be referred to a still image obtained from a video. Based on the localization at a first frame 650, the actor 652 (e.g., running woman) may be localized in the subsequent frames 654. The localized actor 652 is identified by a bounding box 656. The object localization system of FIG. 6C does not localize an action and an actor 652. In this example, the systems cannot determine whether the woman 652 is walking or running as the frame does not convey spatio-temporal information. Rather, based on the appearance of running, the woman 652 is localized in response to the query.

FIG. 7 illustrates an example of segmenting actors and actions according to aspects of the present disclosure. As shown in FIG. 7, an actor and a corresponding action are segmented based on a natural language query 700. In a first example 702A, for a sequence of three exemplary frames 712, the natural language query 700 is "segment the man in the dark suit standing in the back." In response to the query, the actor and action localization model localizes (e.g., identifies) a man in a dark suit 704 standing in the back.

The man in the dark suit 704 is distinguished from the other actors, such as a running man 708, and a dog 710. Specifically, the man in the dark suit 704 is distinguished based on the corresponding description (e.g., "dark suit") and the corresponding action (e.g., "standing"). As shown in FIG. 7, the pixels corresponding to the localized man in a dark suit 704 standing in the back (e.g., the localized action and actor) are distinguished from other pixels in the sequence of three exemplary frames 712 of the first example 702A.

In a second example 702B, for the sequence of three exemplary frames 712, the natural language query 700 is "segment the dog participating in an agility event." In response to the query, the actor and action localization model localizes the dog 710 participating in an agility event. In this example, the dog 710 is distinguished from the other actors 704, 708. Specifically, the dog 710 is distinguished based on the corresponding description (e.g., "dog") and the corresponding action (e.g., "participating in an agility event"). As shown in FIG. 7, the pixels corresponding to the localized dog 710 (e.g., the localized action and actor) are distinguished from other pixels in the sequence of three exemplary frames 712. The pixel distinction shown in FIG. 7 is for illustrative purposes, the pixel distinction of the present disclosure is not limited to the type of pixel distinction shown in FIG. 7.

In a third example 702C, for the sequence of three exemplary frames 712, the natural language query 700 is "segment the person with the white shirt running with a dog." In response to the query, the actor and action localization model localizes the running man 708 in the white shirt. In this example, the running man 708 is distinguished from the other actors 704, 710. Specifically, the running man 708 is distinguished based on the corresponding description (e.g., "person with the white shirt") and the corresponding action (e.g., "running with a dog"). As shown in FIG. 7, the pixels corresponding to the running man 708 (e.g., the localized action and actor) are distinguished from other pixels in the sequence of three exemplary frames 712.

Figure 8:
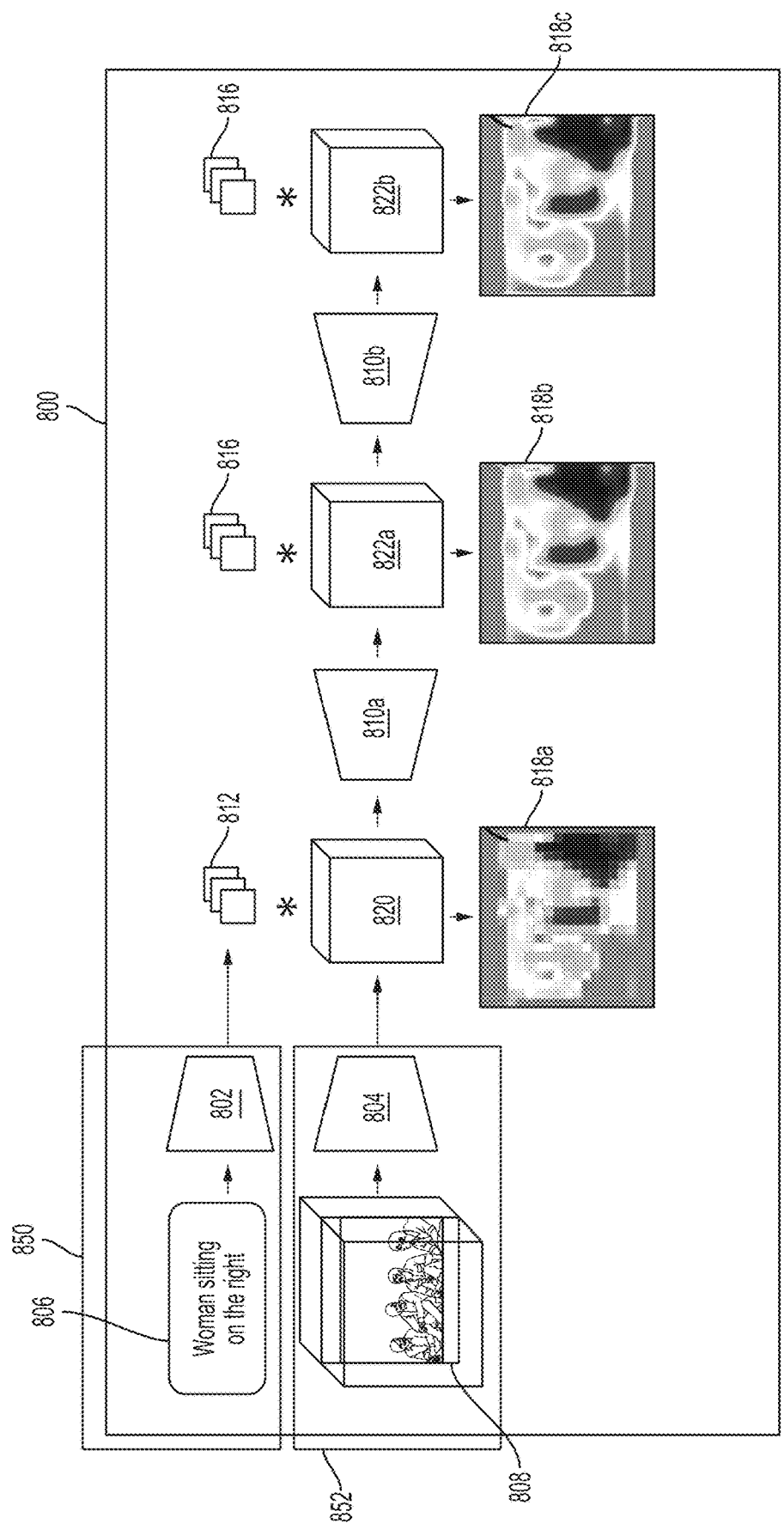
FIG. 8 illustrates an example of an actor and action localization model, according to aspects of the present disclosure.

FIG. 8 illustrates an example of an actor and action localization model 800 according to aspects of the present disclosure. As shown in FIG. 8, the actor and action localization model 800 is a two stream system. A first stream 850 receives a natural language query 806 as an input. A second stream 852 receives N frames of a video 808 as an input. The actor and action localization model 800 is configured for localizing an actor and an action in the video 808 based on the natural language query 806. The action and actor localization module 436 of FIG. 4 may incorporate the actor and action localization model 800.

As shown in FIG. 8, the action and actor localization model 800 includes various components. These components may include a convolutional neural network 802 to represent expressions, a deep convolutional neural network 804 to generate spatial visual representation, dynamic filters 812, 816 to perform fully convolutional segmentation, and deconvolutional neural networks 810a, 810b to output pixel-wise segmentation predictions. The convolutional neural network 802 may be a component of the first stream 850. Furthermore, the deep convolutional neural network 804 may be a component of the second stream 852.

In one configuration, the convolutional neural network 802 processes the natural language query 806. The convolutional neural network 802 may be a one-dimensional (1D) convolutional neural network including one convolutional layer followed by a rectified linear unit (ReLU) activation function and a max-pooling layer. The convolutional neural network 802 obtains a representation for the text sequence of the natural language query 806. That is, the convolutional neural network 802 may encode each word of the natural language query 806, such that each word is represented as a multi-dimensional vector.

As discussed, the first set of dynamic filters 812 is generated based on the representation of the text sequence. The second set of dynamic filters 816 may be generated based on the representation of the text sequence query and a visual representation obtained from a pixel-wise segmentation response map 818a, 818b, 818c. The dynamic filters 812, 816 may be used for fully convolutional segmentation. Each pixel-wise segmentation response map 818a, 818b, 818c may have a different resolution. For example, the pixel-wise segmentation response maps 818a, 818b, 818c may have a resolution of 32×32, 128×128, and 512×512, respectively.

Furthermore, as shown in FIG. 8, N frames of the input video 808 may be input to a convolutional neural network 804, such as an inflated 3D (I3D) network. The input video 808 may have a 512×512 resolution with three channels (e.g., RGB channels). In one configuration, each frame of the input video 808 may be zero-padded to a size of 512×512. The output of the convolutional neural network 804 may be a visual representation 820 of each frame of the input video 808. The visual representation 820 encodes information corresponding to both an actor and an action, while preserving spatial information. The visual representation 820 may also be referred to as a feature map.

Each visual representation 820 generated by the convolutional neural network 804 is convolved with the first set of dynamic filters 812 to obtain the first pixel-wise segmentation response map 818a for each frame. Specifically, the model 800 convolves the visual representation 820 of each frame with the first set of dynamic filters 812 to obtain a first response map 818a. The first response map 818a may be a pixel-wise segmentation response map.

Based on the values for each pixel in the first response map 818a, a label is determined for each pixel. The labels may be determined based on thresholding. For example, if a pixel has a value equal to or greater than zero, the pixel is labeled "1." Alternatively, if the pixel has a value that is less than zero, the pixel is labeled "0." The model may localize the action and the actor in each frame based on the labels.

After the first stage, one or more first deconvolutional neural networks 810a may up-sample the visual representation 820 from a previous convolution to generate a first upsampled visual representation 822a. Each set of the second set of filters 816 may be generated based on the representation of the text sequence query. Alternatively, the second set of filters 816 may be generated based on the representation of the text sequence query and a visual representation 820. The first deconvolutional neural network(s) 810a convolves the first upsampled visual representation 822a with the corresponding second set of filters 816 to output a second pixel-wise segmentation response map 818b.

Additionally, one or more second deconvolutional neural networks 810b may up-sample the first upsampled visual representation 822a from a previous convolution to generate a second upsampled visual representation 822b. The second deconvolutional neural network(s) 810b convolves the second upsampled visual representation 822b with the corresponding second set of filters 816 to output a third pixel-wise segmentation response map 818c. The number of deconvolutional neural networks 810a, 810b of FIG. 8 are for illustrative purposes. More or fewer deconvolutional neural networks 810a, 810b may be used.

The first deconvolutional neural network(s) 810a and the second deconvolutional neural network(s) 810b may be the same network or different networks. Labels may be applied to the pixels based on each response map 818a, 818b, 818c. The up-sampling improves actor and action detection (e.g., localization). The dynamic filters 812, 816 and deconvolutional neural networks 810a, 810b are learnable parts of the action and actor localization model 800, such that they are trained simultaneously. In this case, the dynamic filters 812, 816 and deconvolutional neural networks 810a, 810b implicitly depend on each other.

Figure 9:
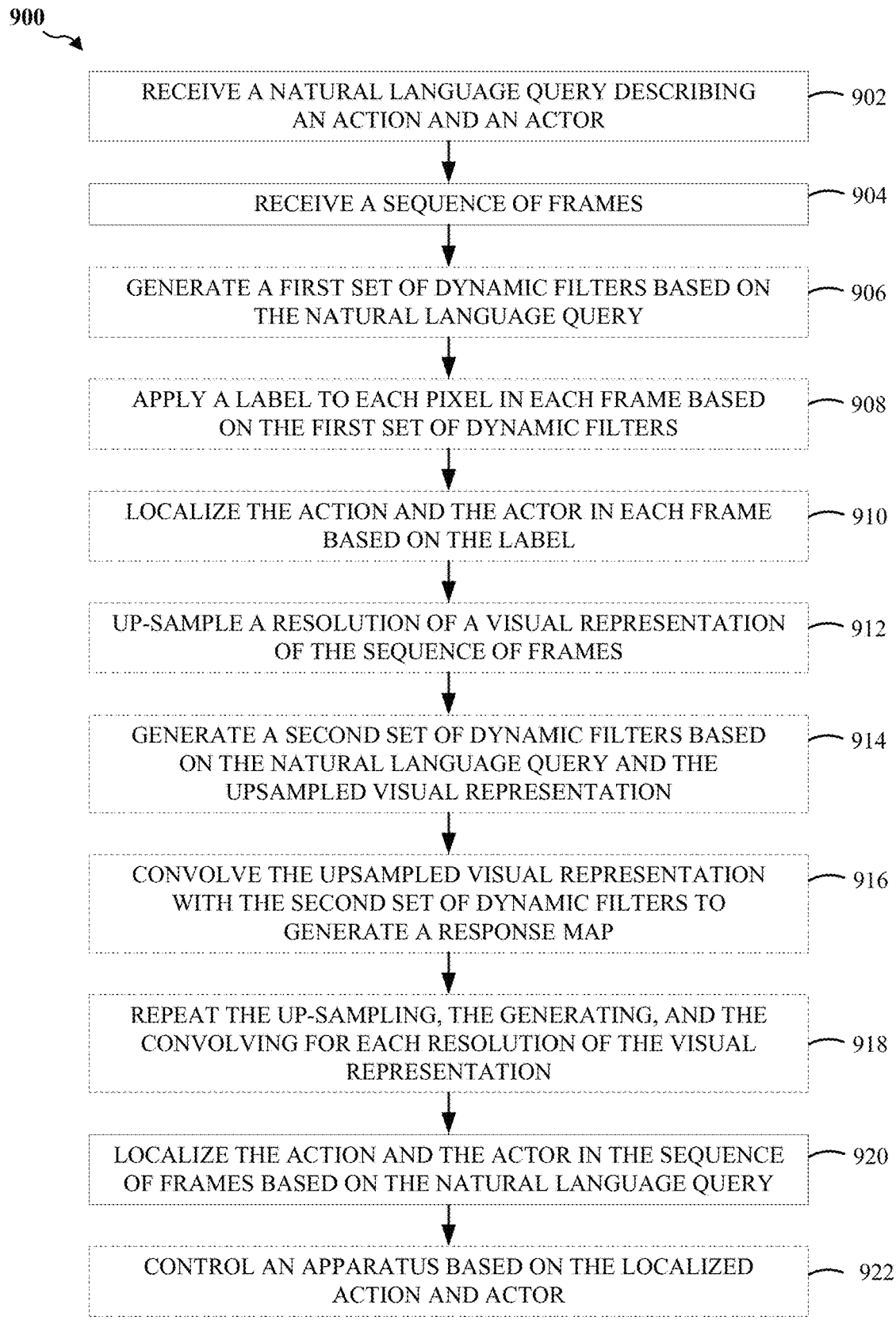
FIG. 9 illustrates a flow diagram for a method for pixel-wise actor and action localization in a sequence of frames based on a natural language query, according to aspects of the present disclosure.

FIG. 9 illustrates a method 900 for pixel-wise action and actor localization according to aspects of the present disclosure. As shown in FIG. 9, at block 902 an actor and action localization model (e.g., a model) receives a natural language query describing the action and the actor. For example, the query may be in a form of a sentence and may be received via a first user interface. At block 904, the model receives a sequence of frames, for example, a video. The sequence of frames may be received via a second user interface. The first and second user interface may be the same or different.

In an optional configuration, at block 906 the model generates a first set of dynamic filters based on the natural language query. Furthermore, in this optional configuration, at block 908, the model applies a label to each pixel in each frame based on the first set of dynamic filters. That is, the model convolves a visual representation (e.g., feature map) of each frame with the first set of dynamic filters to generate a response map. The response map applies the label to each pixel. Additionally, in this optional configuration, at block 910, the model localizes the action and the actor in each frame based on the label.

In another optional configuration, at block 912, the model up-samples a resolution of a visual representation of the sequence of frames. The up-sampling improves actor and action detection. In this optional configuration, at block 914, the model generates a second set of dynamic filters based on the natural language query and the upsampled visual representation. Finally, in this optional configuration, at block 916, the model convolves the upsampled visual representation with the second set of dynamic filters to generate a response map. The response map applies the label to each pixel. The first set of dynamic filters and the second set of dynamic filters may be 2D or 3D filters.

Various resolutions may be used for the visual representations. For example, as shown in FIG. 8, the visual representations may have a resolution of 32×32, 128×128, and 512×512. The resolutions are non-limiting and are used as an example. Other resolutions are also contemplated. In an optional configuration, at block 918, the model repeats the up-sampling, the generating, and the convolving for each resolution of the visual representation. That is, blocks 912, 914, and 916 are repeated for each resolution of the visual representation.

At block 920, the model localizes the action and the actor in the sequence of frames based on the natural language query. That is, the action and actor may be segmented in the sequence of frames. Finally, in an optional configuration, at block 922, the model controls an apparatus based on the localized action and actor. For example, an apparatus, such as an autonomous vehicle, may be controlled to avoid a collision or navigate to a destination. For example, the model may be defined in an autonomous vehicle, a semi-autonomous vehicle, a robotic device, a mobile device, and/or a stationary computing device. One or more devices may be controlled based on the localized action and actor. For example, the model may be defined in an aerial drone. In this example, the aerial drone may use the model to follow a target, such as a moving tank. In another example, the model may be defined in a security system for an arena. In this example, the model may track a suspect running throughout the arena and control one or more robotic devices to follow the suspect.

In some aspects, the method 900 may be performed by the SOC 100 (FIG. 1). That is, each of the elements of the method 900 may, for example, but without limitation, be performed by the SOC 100 or one or more processors (e.g., CPU 102) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of pixel-wise localization of an actor and an action in a sequence of frames, comprising:
   generating a first set of filters based on a natural language query describing the action and the actor;
   generating a visual representation for each frame of the sequence of frames;
   generating a response map for each frame of the sequence of frames based on a convolution of the first set of filters and the visual representation of each frame;
   generating a second set of dynamic filters based on the natural language query and the response map;
   labeling pixels in each frame of the sequence of frames based on a convolution of the second set of dynamic filters and an up-sampled visual representation of each frame; and
   localizing the action and the actor in the sequence of frames based on the labeled pixels.

2. The method of claim 1, further comprising:
   up-sampling a resolution of the visual representation; and
   convolving the up-sampled visual representation with the second set of dynamic filters.

3. The method of claim 2, further comprising repeating the up-sampling and the convolving for a set of resolutions of the visual representation.

4. The method of claim 2, in which the first set of filters and the second set of dynamic filters are two-dimensional or three-dimensional filters.

5. The method of claim 1, further comprising controlling an apparatus based on the localized action and actor.

6. An apparatus for pixel-wise localization of an actor and an action in a sequence of frames, the apparatus comprising:
   means for generating a first set of filters based on a natural language query describing the action and the actor;
   means for generating a visual representation for each frame of the sequence of frames;
   means for generating a response map for each frame of the sequence of frames based on a convolution of the first set of filters and the visual representation of each frame;
   means for generating a second set of dynamic filters based on the natural language query and the response map;
   means for labeling pixels in each frame of the sequence of frames based on a convolution of the second set of dynamic filters and an up-sampled visual representation of each frame; and
   means for localizing the action and the actor in the sequence of frames based on the labeled pixels.

7. The apparatus of claim 6, further comprising:
   means for up-sampling a resolution of the visual representation; and
   means for convolving the up-sampled visual representation with the second set of dynamic filters.

8. The apparatus of claim 7, further comprising means for repeating up-sampling and convolving for a set of resolutions of the visual representation.

9. The apparatus of claim 7, in which the first set of filters and the second set of dynamic filters are two-dimensional or three-dimensional filters.

10. The apparatus of claim 6, further comprising means for controlling the apparatus based on the localized action and actor.

11. An apparatus for pixel-wise localization of an actor and an action in a sequence of frames, the apparatus comprising:
    a memory; and
    at least one processor coupled to the memory, the at least one processor configured:
    to generate a first set of filters based on a natural language query describing the action and the actor;
    to generate a visual representation for each frame of the sequence of frames;
    to generate a response map for each frame of the sequence of frames based on a convolution of the first set of filters and the visual representation of each frame;
    to generate a second set of dynamic filters based on the natural language query and the response map;
    to label pixels in each frame of the sequence of frames based on a convolution of the second set of dynamic filters and an up-sampled visual representation of each frame; and
    to localize the action and the actor in the sequence of frames based on the labeled pixels.

12. The apparatus of claim 11, in which the at least one processor is further configured to:
    up-sample a resolution of the visual representation; and
    convolve the up-sampled visual representation with the second set of dynamic filters.

13. The apparatus of claim 12, in which the at least one processor is further configured to up-sample and convolve for a set of resolutions of the visual representation.

14. The apparatus of claim 12, in which the first set of filters and the second set of dynamic filters are two-dimensional or three-dimensional filters.

15. The apparatus of claim 11, in which the at least one processor is further configured to control the apparatus based on the localized action and actor.

16. A non-transitory computer-readable medium having program code recorded thereon for pixel-wise localization of an actor and an action in a sequence of frames, the program code executed by a processor and comprising:
    program code to generate a first set of filters based on a natural language query describing the action and the actor;
    program code to generate a visual representation for each frame of the sequence of frames;
    program code to generate a response map for each frame of the sequence of frames based on a convolution of the first set of filters and the visual representation of each frame;

program code to generate a second set of dynamic filters based on the natural language query and the response map;

program code to label pixels in each frame of the sequence of frames based on a convolution of the second set of dynamic filters and an up-sampled visual representation of each frame; and program code to localize the action and the actor in the sequence of frames based on the labeled pixels.

17. The non-transitory computer-readable medium of claim 16, in which the program code further comprises:

program code to up-sample a resolution of the visual representation; and program code to convolve the up-sampled visual representation with the second set of dynamic filters.

18. The non-transitory computer-readable medium of claim 17, in which the program code further comprises program code to up-sample and program code to convolve for a set of resolutions of the visual representation.

19. The non-transitory computer-readable medium of claim 17, in which the first set of filters and the second set of dynamic filters are two-dimensional or three-dimensional filters.

20. The non-transitory computer-readable medium of claim 16, in which the program code further comprises program code to control an apparatus based on the localized action and actor.

* * * * *